3,344,212
RECOVERY OF THERMOPLASTIC FOAM SCRAP MATERIAL

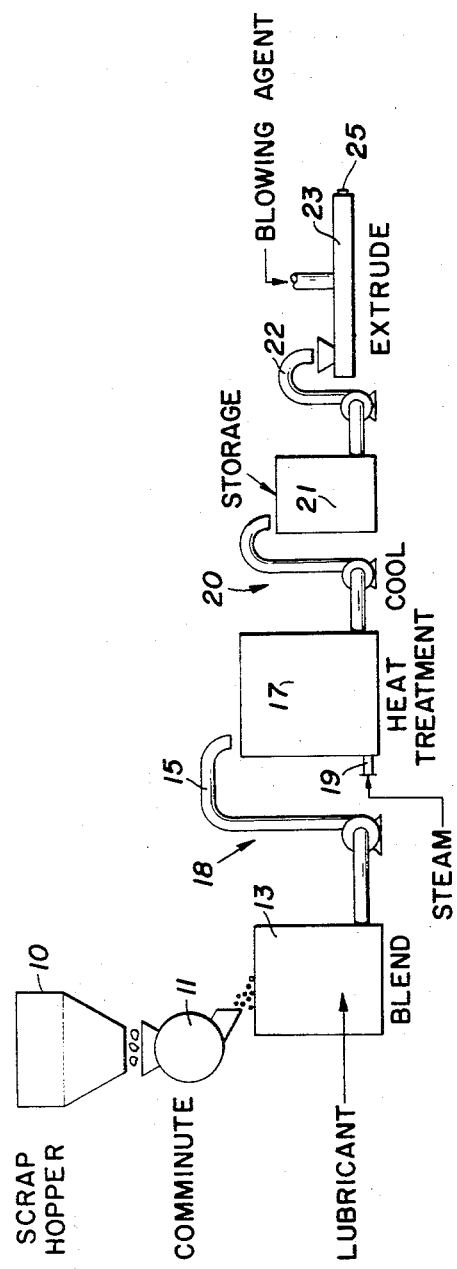

Daniel V. Francis, Pittsburgh, Pa., assignor to Koppers Company, Inc., a corporation of Delaware
Filed Jan. 25, 1965, Ser. No. 427,841
6 Claims. (Cl. 264—37)

This invention relates generally to a process for rendering styrene polymer foam scrap suitable for refeeding to an extruder or other plastics molding equipment.

In the preparation of foam sheets, blocks and other useful objects from expandable styrene polymers, considerable waste occurs in the form of trimmings, cuttings and off-grade material. Because of the fact that the foam scrap material has been expanded to many times the volume of the fresh feed material, the scrap material is so bulky and has such a low bulk density that it does not feed well to processing equipment. This is especially true when the material is fed to an extruder in which the extrusion rate which can be achieved is dependent upon the density of the feed material. An extruder operates on the same principle as a positive displacement pump and, as the density of the feed material decreases, the rate of extrusion decreases to a point where it is no longer economically feasible to operate.

In accordance with this invention, a process is provided for preparing waste styrene polymer foam materials for reuse in conventional equipment. The waste material is first comminuted to discrete particles or flakes of approximately uniform size and shape. The resulting particles are coated with a lubricant and then are subjected to a stream of superheated steam or other hot inert gas while the particles are agitated to prevent agglomeration. The heat treatment is continued for a sufficient period of time such that the bulk density of the particles increases to a final bulk density between about 15 to 30 pounds per cubic foot. After the particles are cooled, they can be mixed with fresh feed stock and fed to an extruder, an injection molding apparatus or to other suitable molding equipment.

The drawing is a schematic illustration of a preferred embodiment of the process of the invention.

Referring now to the drawing, the scrap foam material which can be either edge trim or off-grade material from extrusion or molding operations is held in hopper 10. This material may have a bulk density as low for example as 0.5 pound per cubic foot, or in the case of medium density foam scrap for example 12 pounds per cubic foot whereas normal polystyrene has a bulk density of from 30–40 pounds per cubic foot.

In accordance with this invention, the scrap is fed from hopper 10 to comminuting equipment 11 in which the foam is reduced to particles. Advantageously the material is comminuted to particles having equivalent diameters of between about ⅛ inch and ½ inch. The scrap is comminuted in order to reduce the size of the material so that the foam scrap has a large surface area available for the subsequent heat treating step. The comminuted material will also be the correct size, after the heat treatment, for feeding to the molding or extrusion equipment without further processing. Conventional comminuting equipment can be used to cut the scrap into particles, for example a shredder of the type used in the paper industry.

The particles are introduced into blender 13 where they are coated with from 0.5–5 percent by weight of suitable lubricant in order to render them non-agglomerating in the subsequent heat treatment. At the temperatures employed in the heat treatment the polymer becomes extremely soft and the particles would quickly agglomerate into a stick mass if their surfaces were not protected by the lubricant layer.

Conventional lubricants well known in the art can be employed, for example, alkali metal salts of fatty acids; e.g., zinc stearate, lithium stearate; fatty acid amides; e.g., stearamide, oleamide and methylene-bis-stearamide; fatty acid esters, e.g., butylstearate; and the fatty acids themselves.

Conventional blending equipment can be used to coat the particles such as a ribbon blender or a double-cone blender and the mixing is continued until no free lubricant powder remains at which time the surface of the particles will have become uniformly coated. This takes from 5–15 minutes depending upon the type and size of the blender employed.

The coated particles are fed through conduit 15 by means of a conventional airveyor 18 to a heat treatment vessel 17. Vessel 17 is an insulated cylindrical vessel which has a motor driven axial stirrer which has radially extending stirring bars that mesh between fixed horizontal bars which are attached to the cylinder. It has been found that a Rodman Steam Pre-expander described in U.S. Patent No. 3,023,175 issued Feb. 27, 1962 can be readily modified for this purpose. Normally, a Rodman Steam Pre-expander is used to decrease the bulk density of the polystyrene particles. Thus, the polymer particles, containing blowing agent, are continuously fed to the bottom of the vessel and steam or other heated gases are blown through the vessel in order to cause the blowing agent to vaporize and expand the heat softened particles. As the particles expand, they decrease in bulk density causing them to rise and exit from the top of the vessel.

In the process of the invention, the Rodman apparatus is modified so that it can be used to increase the bulk density of the polymer particles. This is possible because the scrap feed material is for the most part non-expandable due to the fact that its previously contained blowing agent was largely expended during the initial foaming operation. Therefore, although some initial expansion of the particles may occur due to the presence of residual blowing agent, the gas temperature employed is high enough so that as the heat treatment continues the walls of the particles tend to melt and collapse causing the particles to shrink and the bulk density of the particles to greatly increase. As the density of the particles increases they tend to settle to the bottom of vessel 17. Therefore, the untreated particles are continuously fed into the top of vessel 17 and the treated particles are continuously removed at the bottom of vessel 17. This operation is the opposite of the operation when using the equipment to pre-expand polymer particles.

As the particles are fed into vessel 17, they are continuously stirred to prevent agglomeration and superheated steam or other heated inert gases are fed into the bottom of vessel 17 through conduit 19. The temperature of the gases can vary from between about 225–380° F. with a preferred range being 275–360° F. The gases pass up through the particles in vessel 17. The particles are treated until their bulk density has increased to a final bulk density of about 15 to 30 pounds per cubic foot or about 1.5 to 40 times the original bulk density of the feed material. The residence time in vessel 17 to accomplish the increase in bulk density varies anywhere from about 3 minutes to an hour depending upon the temperature of the heating gas employed, the bulk density of the feed material and the desired final bulk density of the treated particles.

The treated particles are continuously removed from the bottom of vessel 17 and conveyed by means of airveyor 20 into storage chamber 21. In passing from vessel 17 to storage chamber 21 the particles are cooled in airveyor 20 to below 180° F. which is a sufficiently low temperature so that particles do not agglomerate when they are introduced into storage bin 21. The particles are then ready for reuse by feeding them through a suitable conduit 22 to conventional processing equipment, for example injection extruder 23 which is adapted for the injection of blowing agent into the material and the extrusion of polystyrene foam film.

The operation of the invention is illustrated in the following example which it is expressly understood is not intended as a definition of the invention but is for the purposes of illustration only:

The combination of edge trim and off-grade material from the extrusion of polystyrene foam film was fed to comminuter 11 where the waste material was reduced to flakes which were approximately 50 mils thick and which had equivalent diameters from between about ¼ to ½ inch. The bulk density of the foam flakes was about 2.25 pounds per cubic foot. The flakes were introduced into ribbon blender 13 where they were mixed with 2 percent by weight of zinc stearate. The mixing operation took approximately 10 minutes. The lubricated flakes were then fed through airveyor 18 to the top of vessel 17. The flakes were contacted with superheated steam at 300° F. passing through conduit 19 and blowing up through vessel 17 while the flakes were being continuously stirred. The treated flakes were continuously removed from the bottom of vessel 17 with the average residence time of the flakes in heat treating vessel 17 being approximately 5 minutes. The flakes were cooled to approximately 180° F. in airveyor 20 while being passed to storage bin 21.

The bulk density of the resultant product was approximately 21 pounds per cubic foot and the product consisted of particles which had approximately the original thickness of 50 mils but whose equivalent diameters now had been reduced to between about ⅟₁₆ and ¼ inch. The particles from storage bin 21 were transferred to the hopper of extruder 23 where they were mixed with fresh Dylene® 8 polystyrene beads in approximately equal amounts by weight. Dylene® 8 polystyrene is a commercial product consisting of beads whose size ranges from about 20–70 mesh and which has a bulk density of about 38 to 39 pounds per cubic foot. The material was heated in extruder 23 to render it thermoplastic and mixed with 5.0 percent by weight n-pentane after which it was extruded through an orifice 25 at the end of extruder 23 to produce a foam film sheet having a thickness of 50 mils and a true density of 6.0 pounds per cubic foot.

This process can be employed in a recovery of foam scrap of the variety of expandable styrene polymers, homopolymers and copolymers derived from vinyl aromatic monomers such as styrene, divinyl benzene, vinyl toluene, isopropyl styrene, alpha-methylstyrene, nuclear dimethyl styrene, chlorostyrene, vinyl naphthalene, etc. as well as copolymers prepared by the polymerization of a vinyl aromatic monomer with minor amounts of monomers such as butadiene, isobutylene, acrylonitrile, itaconic acid, methylmethacrylate, etc.

The foregoing has described a novel and convenient method of rendering thermoplastic foam scrap material reusable by increasing its bulk density so that it can be conveniently mixed with fresh feed material and fed to conventional processing equipment without adversely affecting the process or requiring modification of the equipment. The equipment required to carry out the process of the invention is conventional and is normally available in plastics molding operations. Therefore, the process can be easily set up within the limits of existing facilities to continuously treat and return scrap material to a process as it is formed which leads to process economy which has not heretofre been possible to achieve.

I claim:

1. A process for preparing waste styrene polymer foam material for reuse comprising comminuting said material into particles, coating said particles with a lubricant, subjecting said particles to a stream of hot inert gas while agitating said particles to prevent agglomeration, the heating being carried out for a sufficient period of time such that the bulk density of said particles increases to a final bulk density between about 15–30 pounds per cubic foot and cooling said particles.

2. A process for preparing waste styrene polymer foam material for reuse comprising comminuting said material into particles, coating said particles with a lubricant, subjecting said particles to a stream of hot inert gas while agitating said particles to prevent agglomeration, the heating being carried out for a sufficient period of time such that the bulk density of said particles is from about 1.5 to 40 times the original bulk density of said material, and cooling said particles.

3. A process for preparing waste styrene polymer foam material for reuse comprising comminuting said material into particles, coating said particles with a lubricant, subjecting said particles to a stream of superheated steam while agitating said particles to prevent agglomeration, the heating being carried out for a sufficient period of time such that the bulk density of said particles is from about 1.5 to 40 times the original bulk density of said material, and cooling said particles.

4. A process for preparing waste styrene polymer foam material for reuse comprising comminuting said material into particles having equivalent diameters of between about ⅛ and ½ inch, coating the surface of said particles with from 0.5 to 5 percent of a lubricant, subjecting said particles to a stream of inert gas heated to a temperature of between 225 and 380° F. for from 3 to 60 minutes while agitating said particles to prevent agglomeration, the heating being carried out for a sufficient period of time such that the bulk density of said particles increases to a final bulk density between about 15–30 pounds per cubic foot, and cooling said particles to a temperature below about 180° F.

5. A process for reusing waste styrene polymer foam material comprising comminuting said material into small flakes, coating said flakes with a lubricant, subjecting said flakes to a stream of hot inert gas while agitating said flakes to prevent agglomeration, the heating being carried out for a sufficient period of time such that the bulk density of said flakes is from about 1.5 to 40 times the original bulk density of said material, cooling said flakes, feeding said flakes to a heated mixing zone such that said flakes are reduced to a thermoplastic mass, incorporating a blowing agent into said thermoplastic mass in said mixing zone to produce a foamable composition, and extruding said composition to produce a polymer foam.

6. A process for reusing waste styrene polymer foam material comprising comminuting said material into flakes having equivalent diameters of between about ⅛ and ½ inch, coating the surface of said flakes with from 0.5 to 5 percent of a lubricant, subjecting said flakes to a stream of inert gas heated to a temperature of between 225 and 380° F. for from 3 to 60 minutes while agitating said flakes to prevent agglomeration, such that the bulk density of said flakes is increased to a final bulk density between about 15 to 30 pounds per cubic foot, cooling said flakes to a temperature below about 180° F., feeding said flakes to a heated mixing zone such that said flakes are reduced to a thermoplastic mass, incorporating a blowing agent into said thermoplastic mass in said mixing zone to produce a foamable composition, and extruding said composition to produce a polymer foam.

References Cited

UNITED STATES PATENTS 2,838,801   6/1958   De Long et al. ____ 264—53 XR
3,086,885   4/1963   Jahn _____ 260—2.5 XR
3,255,286   6/1966   Luc-Belmont _____ 264—109
3,301,935   1/1967   Stoeckhert _____ 264—321

OTHER REFERENCES

Collins, F. H., "Controlled Density Polystyrene Foam Extrusion." In SPE Journal, July 1960, pp. 705-709. Copy in 264–53.

ALEXANDRIA H. BRODMERKEL, *Primary Examiner.*

P. ANDERSON, *Assistant Examiner.*